United States Patent
Duan et al.

(10) Patent No.: US 12,005,808 B2
(45) Date of Patent: Jun. 11, 2024

(54) METHODS AND APPARATUS FOR PROPULSION SYSTEM PROGNOSTICS DUE TO BOOSTED OPERATION

(71) Applicant: GM GLOBAL TECHNOLOGY OPERATIONS LLC, Detroit, MI (US)

(72) Inventors: Shiming Duan, Ann Arbor, MI (US); Yiran Hu, Shelby Township, MI (US); Shifang Li, Shelby Township, MI (US); Brent S. Gagas, Pleasant Ridge, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 352 days.

(21) Appl. No.: 17/318,949

(22) Filed: May 12, 2021

(65) Prior Publication Data
US 2022/0363162 A1 Nov. 17, 2022

(51) Int. Cl.
*B60L 58/16* (2019.01)
*B60L 58/12* (2019.01)

(52) U.S. Cl.
CPC ............. *B60L 58/16* (2019.02); *B60L 58/12* (2019.02); *B60L 2240/423* (2013.01); *B60L 2240/429* (2013.01); *B60L 2240/547* (2013.01); *B60L 2240/549* (2013.01); *B60L 2260/167* (2013.01)

(58) Field of Classification Search
CPC .... B60L 58/16; B60L 58/12; B60L 2240/423; B60L 2240/429; B60L 2240/547; B60L 2240/549; B60L 2260/16
See application file for complete search history.

(56) References Cited

U.S. PATENT DOCUMENTS

| | | | |
|---|---|---|---|
| 2011/0130901 A1* | 6/2011 | Mori | B60K 6/48 180/65.265 |
| 2016/0093116 A1 | 3/2016 | Ahn et al. | |
| 2018/0106262 A1* | 4/2018 | Carpenter | F04D 29/058 |
| 2018/0204393 A1* | 7/2018 | Landolsi | G07C 5/006 |
| 2021/0284179 A1* | 9/2021 | Diamond | B60W 50/00 |

OTHER PUBLICATIONS

Chinese search report for Chinese Application No. 202210395766.9 dated Jan. 25, 2024.

* cited by examiner

*Primary Examiner* — James J Lee
*Assistant Examiner* — Steven Vu Nguyen

(57) ABSTRACT

A diagnostic system for a vehicle includes a vehicle system configured to operate the vehicle in a normal operating mode and a boosted mode. In the boosted mode, the vehicle system increases at least one of a maximum motor torque, a maximum engine torque, and a maximum battery power available to the vehicle. A wear estimation module is configured to collect wear data associated with a component of the vehicle while being operated in the boosted mode, estimate, based on the collected wear data, wear of the component caused by being operated in the boosted mode, and generate a prediction of a remaining lifetime of the component based on the estimated wear of the component.

18 Claims, 4 Drawing Sheets

METHODS AND APPARATUS FOR PROPULSION SYSTEM PROGNOSTICS DUE TO BOOSTED OPERATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to diagnostic systems for assessing vehicle component wear during boosted performance operations.

A propulsion system of a vehicle includes a plurality of components related to powering, propelling, steering, and braking the vehicle. These components experience different degrees of wear during operation, and each component may have an associated durability and predicted lifetime based on usage.

SUMMARY

A diagnostic system for a vehicle includes a vehicle system configured to operate the vehicle in a normal operating mode and a boosted mode. In the boosted mode, the vehicle system increases at least one of a maximum motor torque, a maximum engine torque, and a maximum battery power available to the vehicle. A wear estimation module is configured to collect wear data associated with a component of the vehicle while being operated in the boosted mode, estimate, based on the collected wear data, wear of the component caused by being operated in the boosted mode, and generate a prediction of a remaining lifetime of the component based on the estimated wear of the component.

In other features, the wear estimation module is configured to execute at least one component wear model that models component wear as a function of operating conditions during the boosted mode.

In other features, the at least one model includes a health model configured to generate a health parameter H based on performance indicators of the component during the boosted mode.

In other features, the component is a battery and the performance indicators include at least one of battery resistance, battery voltage and/or current, battery state of charge, and estimated capacity.

In other features, the component is a motor and the performance indicators include at least one of a motor torque response time, a motor torque accuracy, an estimated motor coil resistance, an estimated motor coil inductance, a maximum torque achieved, and a maximum current achieved.

In other features, the component is an inverter and the performance indicators include at least one of a motor current response time, a motor current accuracy, a motor voltage response time, a motor voltage accuracy, and pulse width modulation accuracy.

In other features, the component is a drive unit and the performance indicators include at least one of bearing vibration, bearing noise, and drive unit efficiency.

In other features, the at least one model includes an energy model configured to generate an energy parameter E based on energy parameters indicative of energy applied to the component during the boosted mode.

In other features, the at least one model includes a wear model configured to generate a wear parameter indicated the wear of the component based on the health parameter H and the energy parameter E.

In other features, the wear estimation module is further configured to collect the wear data from a plurality of vehicles, estimate the wear of the component based on the wear data collected from the plurality of vehicles, and generate the prediction of the remaining lifetime of the component based on the wear data collected from the plurality of vehicles.

In other features, the wear data collected from the plurality of vehicles includes indication of failures of the component in the plurality of vehicles, and the wear estimation module is configured to generate a probability that the component will fail in the vehicle based on the failures of the component in the plurality of vehicles.

In other features, the vehicle system is configured to adjust at least one of criteria for transitioning to the boosted mode and control during the boosted mode based on the prediction of the remaining lifetime of the component.

In other features, the criteria include at least one of a maximum motor torque and a maximum engine torque available to the vehicle during the boosted mode and a frequency of the boosted mode and the control includes torque distribution to different axles of the vehicle during the boosted mode.

A method of determining wear of a component a vehicle includes transitioning the vehicle from a normal operating to a boosted mode, wherein, in the boosted mode, at least one of a maximum motor torque, a maximum engine torque, and a maximum battery power available to the vehicle is increased relative to the normal operating mode, collecting wear data associated with the component of the vehicle while being operated in the boosted mode, estimating, based on the collected wear data, the wear of the component as caused by being operated in the boosted mode, and generating a prediction of a remaining lifetime of the component based on the estimated wear of the component.

In other features, the method includes estimating the wear of the component includes executing at least one component wear model that models component wear as a function of operating conditions during the boosted mode.

In other features, the at least one model includes a health model configured to generate a health parameter H based on performance indicators of the component during the boosted mode.

In other features, the component is a battery and the performance indicators include at least one of battery resistance, battery voltage and/or current, battery state of charge, and estimated capacity, the component is a motor and the performance indicators include at least one of a motor torque response time, a motor torque accuracy, an estimated motor coil resistance, an estimated motor coil inductance, a maximum torque achieved, and a maximum current achieved, the component is an inverter and the performance indicators include at least one of a motor current response time, a motor current accuracy, a motor voltage response time, a motor voltage accuracy, and pulse width modulation accuracy, or the component is a drive unit and the performance indicators include at least one of bearing vibration, bearing noise, and drive unit efficiency.

In other features, the at least one model includes an energy model configured to generate an energy parameter E based on energy parameters indicative of energy applied to the component during the boosted mode.

In other features, the at least one model includes a wear model configured to generate a wear parameter indicated the wear of the component based on the health parameter H and the energy parameter E.

In other features, the method further includes adjusting at least one of criteria for transitioning to the boosted mode and control during the boosted mode based on the prediction of the remaining lifetime of the component.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicles may be configured to selectively implement different driving modes that provide increased power and performance. For example, a vehicle may selectively activate a boosted mode (e.g., a "maximum power" mode) for a limited duration in response to driver inputs. In the boosted mode, the vehicle may allow maximum limits on various power parameters (e.g., motor and engine torque, engine speed, batter power, etc.) to increase for the limited duration.

Wear on various components may increase during the boosted mode. For example, vehicle operation during the boosted mode may increase wear on components including, but not limited to, components of an electric or hybrid vehicle propulsion system (e.g., a high voltage battery system including one or more batteries, an electric motor, an inverter, a drive unit, etc.), an engine, and a transmission.

Vehicle diagnostic systems and methods according to the present disclosure are configured to monitor increased wear to selected components during boosted operation and predict component lifetime and failure accordingly. Data associated with increased wear may be collected from individual vehicles and compiled with data collected from other vehicles. Collection and analysis of data may be facilitated using a cloud computing system, and collected data may be updated based on actual component failure that may occur across multiple vehicles.

For example, models that predict component failure may be updated as actual failures occur in similar components. In some examples, boosted operations may be limited in response to a determination that one or more components are approaching a predicted end of life to prevent damage and premature failure.

Figure 1:
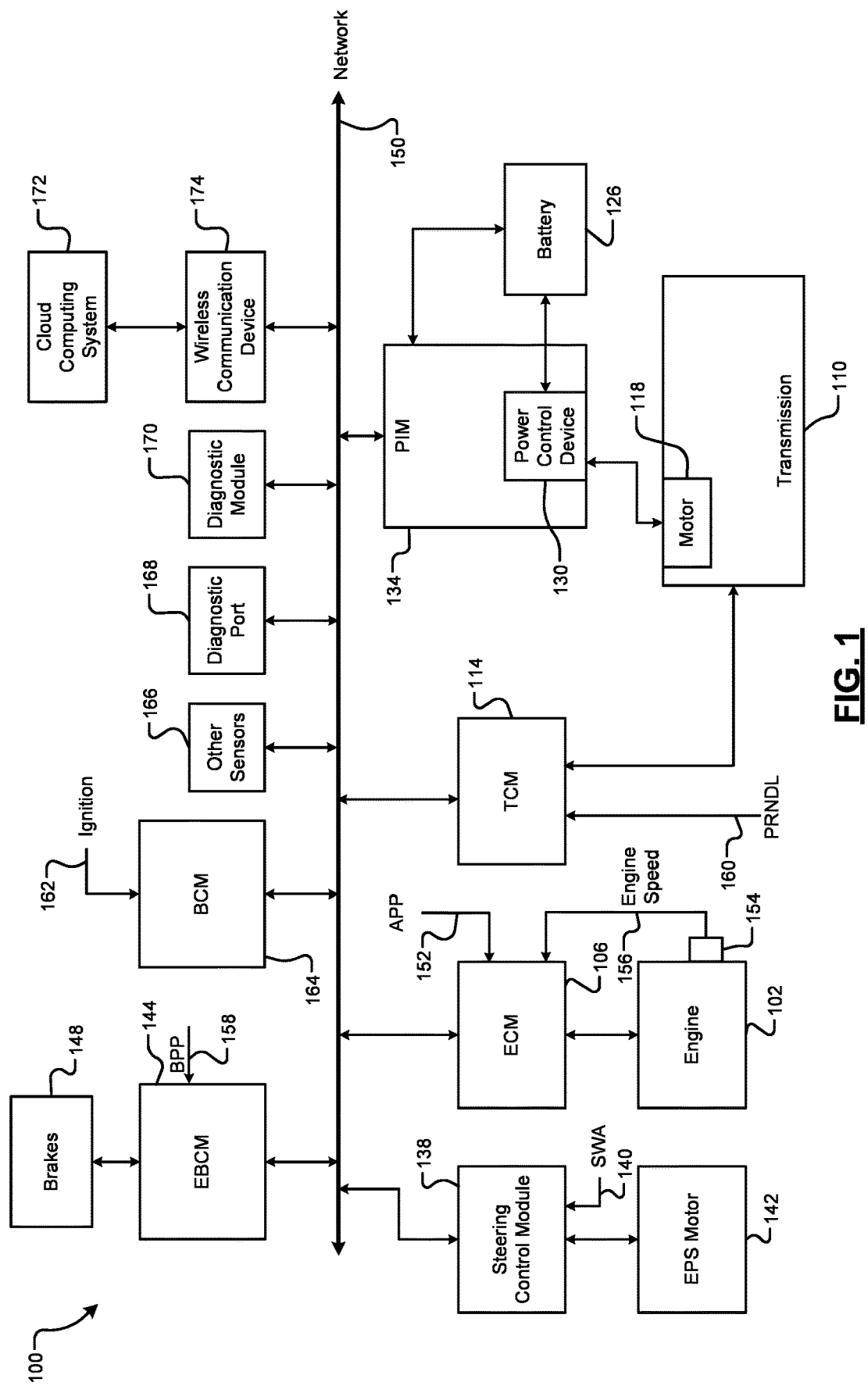
FIG. 1 is a functional block diagram of an example vehicle system according to the present disclosure.

Referring now to FIG. 1, a functional block diagram of an example vehicle system 100 of a vehicle according to the present disclosure is shown. While a vehicle system 100 for a hybrid vehicle is shown and will be described, the present disclosure is also applicable to non-hybrid vehicles, electric vehicles, fuel cell vehicles, autonomous vehicles, semi-autonomous vehicles, non-autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. The ECM 106 may be configured to selectively activate a boosted mode for a limited duration in response to driver inputs (e.g., e.g., to transition the vehicle from a normal operating mode to a boosted mode in response to a torque request).

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1. In electric vehicles, the electric motor 118 and the transmission 110 constitute a drive unit. The electric motor 118 can act as either a generator at some times or as a motor at other times. When acting as a generator, the electric motor 118 converts mechanical energy into electrical energy. The electrical energy can be, for example, used to charge a battery 126 via a power control device (PCD) 130 (e.g., including an inverter). When acting as a motor, the electric motor 118 outputs positive torque that may be used, for example, to supplement or replace torque output by the engine 102. While the example of one electric motor is provided, the vehicle may include more than one electric motor. Regeneration occurs when the electric motor 118 is converting mechanical energy into electrical energy. Regeneration slows (brakes) the vehicle.

A power inverter control module (PIM) 134 controls the PCD 130 to control power flow to and from the electric motor 118. At some times, the PIM 134 controls the PCD 130 to convert direct current (DC) power from the battery 126 into alternating current (AC) power and apply the AC power to the electric motor 118. The electric motor 118 outputs positive torque when power is applied to the electric motor 118. At other times, the PIM 134 controls the PCD 130 also converts AC power generated by the electric motor 118 into DC power and provides the DC power, for example, to the battery 126. The electric motor 118 outputs negative torque (and decelerates the vehicle) when the electric motor 118 is outputting power. The PIM 134 may be referred to as a power inverter module (PIM) in various implementations.

A steering control module 138 controls steering/turning of wheels of the vehicle, for example, based on driver turning of a steering wheel within the vehicle and/or steering commands from one or more vehicle modules. A steering wheel angle (SWA) sensor monitors rotational position of the steering wheel and generates a SWA signal 140 based on the position of the steering wheel. As an example, the steering control module 138 may control vehicle steering via an electronic power steering (EPS) motor 142 based on the SWA signal 140. However, the vehicle may include another type of steering system. An electronic brake control module (EBCM) 144 selectively controls application of friction brakes 148 of the vehicle.

Modules of the vehicle may share parameters via a network 150, such as a controller area network (CAN). In vehicles, CAN may also stand for car area network. The network 150 may include one or more data buses. Various parameters may be made available by a given control module to other control modules via the network 150.

The driver inputs may include, for example, an accelerator pedal position signal (APP) 152, which may be provided to the ECM 106. An engine speed sensor 154 may measure an engine speed 156 (e.g., in revolutions per minute, RPM) and provide the engine speed 156 to the ECM 106. A brake pedal position (BPP) signal 158 may be provided to the EBCM 144. A position 160 of a range selector, such as a park, reverse, neutral, drive lever (PRNDL), may be provided to the TCM 114. An ignition state 162 may be provided to a body control module (BCM) 164. For example, the ignition state 162 may be input by a driver via an ignition key, button, or switch. At a given time, the ignition state 162 may be one of off, accessory, run, or crank.

The vehicle may also include one or more other sensors 166. Examples of the other sensors 166 include, for example, one or more laser imaging distancing and ranging (LIDAR) sensors, one or more radar sensors, one or more cameras, one or more sonar sensors, one or more temperature sensors, one or more pressure sensors, one or more speed sensors, and other types of sensors. One or more control modules may control respective devices based on input from one or more of the one or more other sensors 166. For example, based on input from one or more of the one or more other sensors 166, the ECM 106 may control the engine 102, the PIM 134 may control the PCD 130, the steering control module 138 may control the EPS motor 142, and/or the EBCM 144 may control the friction brakes 148.

The vehicle may include one or more additional control modules that are not shown, such as a chassis control module, a battery pack control module, etc. The vehicle may omit one or more of the control modules shown and discussed.

Vehicle braking can be performed using the friction brakes 148, regeneration via the electric motor 118, or a combination of friction braking (using the friction brakes 148) and regeneration (using the electric motor 118). Based on the BPP signal 158, the EBCM 144 and the PIM 134 control friction braking and regenerative braking, respectively.

The vehicle may include a diagnostic input/output port 168, such as an on-board diagnostic (OBD) II port. For example, a diagnostic device (not shown) may be connected to the vehicle via the diagnostic input/output port 168, such as by wire or wirelessly by a vehicle service technician. The diagnostic device can collect data from the vehicle, such as any faults diagnosed, one or more parameters associated with the diagnosis of a fault, and other data.

The vehicle system 100 according to the present disclosure includes a diagnostic module 170. The diagnostic module 170 is configured to implement diagnostic systems and methods to monitor increased wear to selected components during boosted operation and predict component lifetime and failure as described below in more detail. The diagnostic module 170 is configured to collect data associated with increased wear from the vehicle system 100 and predict component lifetime and failure accordingly. In some examples, the diagnostic module may communicate with a cloud computing system 172 (e.g., via a wireless communication device 174). The cloud computing system 172 may facilitate collection and analysis of data collected from multiple vehicles, including data collected from the vehicle system 100.

Figure 2:
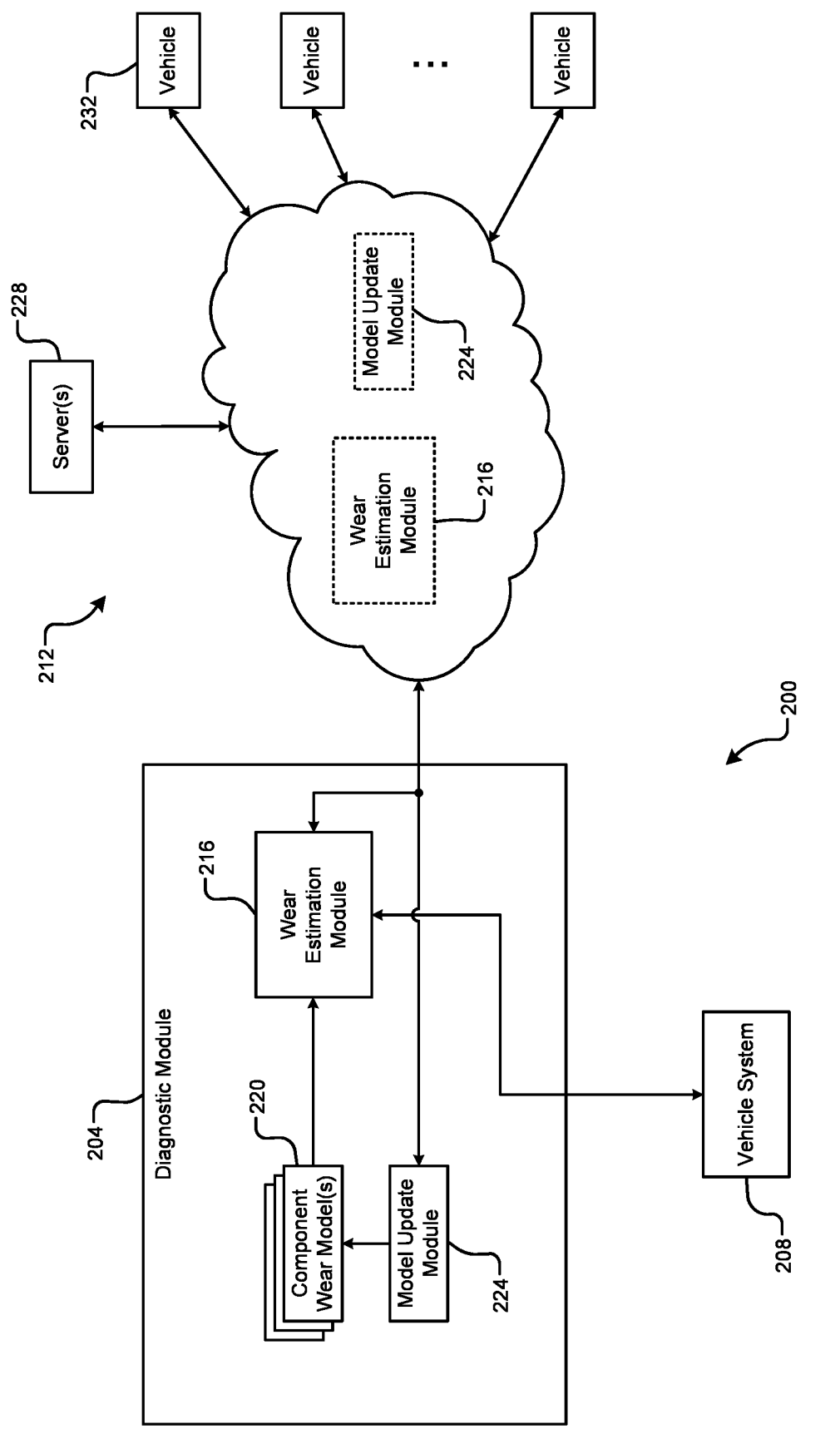
FIG. 2 is an example diagnostic system according to the present disclosure.

Referring now to FIG. 2, an example diagnostic system 200 according to the present disclosure includes a diagnostic module 204 (e.g., corresponding to the diagnostic module 170 of FIG. 1) in communication with a vehicle system 208. In some examples, the diagnostic module 204 communicates with a cloud computing system 212 (e.g., via a wireless communication device or interface; not shown in FIG. 2).

The diagnostic module 204 includes a wear estimation module 216 configured to collect wear data from the vehicle system 208 and estimate component wear accordingly. For example, the wear estimation module 216 executes one or more component wear models 220 (e.g., stored in memory in the diagnostic module 204 or another location in the vehicle system 208) that model component wear as a function of operating conditions during boosted operations. The wear estimation module 216 is further configured to predict a remaining lifetime of respective components based on the estimated component wear. For example, the wear estimation module 216 predicts the remaining lifetime using a pre-trained model. In some examples, a model update module 224 is configured to update the models 220 (e.g., as data associated with component wear is collected over time).

The vehicle system 208 may limit boosted operations based on the wear estimation and predicted remaining lifetime. For example, the diagnostic module 204 may output the predicted remaining lifetime as a ratio, fraction, or percentage of remaining lifetime (e.g., as a remaining x %), an estimated remaining usage in days or miles, etc. The vehicle system 208 (e.g., the ECM 106) limits boosted operation if the predicted remaining lifetime is less than a threshold (e.g., 20% remaining lifetime, 10% remaining lifetime, etc.). For example, the vehicle system 208 changes criteria for activating boosted operation, limits a frequency of boosted operation, reduces a duration of boosted operation, etc.

In some examples, the diagnostic module 204 may notify a driver that service is recommended or required based on the predicted remaining lifetime (e.g., using an infotainment system display, dashboard indicators, audio system, mobile phone message or app, email, etc.). For example, the diagnostic module 204 may generate a notification in response to a determination that the predicted remaining lifetime for one or more components is below a service threshold.

As described above, wear estimation and remaining lifetime prediction may be performed entirely within the vehicle. In other examples, the cloud computing system 212 performs one or more functions of the wear estimation and remaining lifetime prediction. For example, the cloud computing system 212 may include the wear estimation module 216 and the model update module 224 and, in some examples, may store the models 220.

The cloud computing system 212 corresponds to a distributed network system configured to communicate with one or more servers 228, vehicles 232, etc. Accordingly, the wear estimation module 216 may collect data from the vehicle system 208 as well as from vehicle system of the vehicles 232. The collected data includes both wear data associated with respective vehicles and data regarding actual failures of components in the vehicles 232. In this manner, models used to predict remaining lifetime of various components can be updated based on actual lifetimes of components (e.g., in all vehicles 232 in a fleet) that experience additional wear during boosted operation and ultimately fail.

The wear estimation module 216 predicts remaining lifetime based on the updated models and the vehicle system 208 limits boosted operation accordingly.

Figure 3:
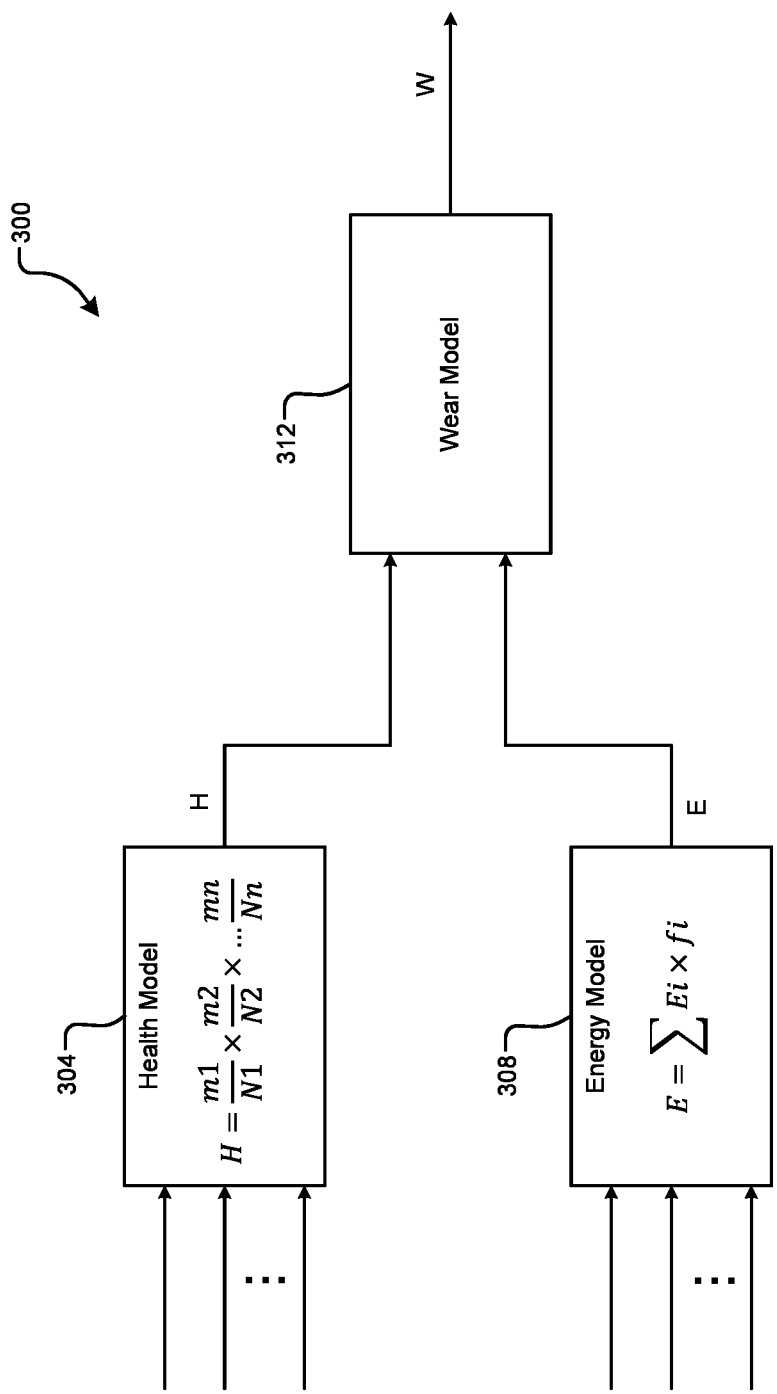
FIG. 3 is an example wear estimation module according to the present disclosure.

Referring now to FIG. 3, an example a wear estimation module 300 is shown. The wear estimation module 300 executes a health model 304, an energy model 308, and a wear model 312. For example, the health model 304 calculates a health parameter H (e.g., as a percentage from 0 to 100) of a component while the energy model 308 calculates energy E applied to the component during various performance conditions.

The health model 304 receives, as inputs, health parameters (e.g., health parameters) associated with various components and performance parameters affecting respective health parameters during boosted operation. For example, the health parameters may include, but are not limited to, a battery resistance, battery capacity, motor resistance, motor inductance, motor torque, current, and voltage, etc. The performance parameters may include, but are not limited to, torque response speed, overshoot, acceleration, maximum current or torque achieved, etc.

The health model 304 calculates the health parameter H in accordance with $$H = \frac{m1}{N1} \times \frac{m2}{N2} \times \ldots \frac{mn}{Nn},$$

where m1 through mn are performance indicators associated with the health parameter that are updated in response to boosted operation and N1 through Nn are baseline performance indicators. For example, N1 through Nn are constants and m1 through mn are initialized at the same value as respective ones of N1 through Nn. Accordingly, each term $$\frac{m}{N}$$

may equal 1 prior to any boosted operation such that H=1 (or, 100%). Conversely, each of m1 through mn may decrease in accordance with respective performance parameters during operation. Accordingly, each term $$\frac{m}{N}$$

may decrease and H decreases below 1 or 100%.

The energy model 308 receives, as inputs, energy parameters indicative of energy applied to the component during boosted operation. For example, the energy parameters may include, but are not limited to, power level and duration, torque level and duration, temperature, etc. during boosted operation. The energy model 308 calculates the energy E in accordance with E=ΣEi×fi, where Ei is an energy factor associated with a respective energy parameter (e.g., a temperature of the component) and fi is a weighting factor applied to the respective energy parameter. Accordingly, the energy E corresponds to a sum of weighted energy factors associated with respective energy parameters during boosted operation.

While the health parameters H are updated during boosted operation, the energy E may be updated regardless of whether boosted operation occurs. In other words, the energy E may continuously and cumulatively increase during the lifetime of a component. However, the weighting factor fi may change (e.g., increase) during boosted operation relative to normal operation. Accordingly, although the energy E is updated during both normal and boosted operation, the energy E may increase at a greater rate during boosted operation.

The wear model 312 calculates and outputs a wear parameter W of the component using the health parameter H and the energy E. For example, the wear parameter W may be determined based on stored data correlating the health and energy parameters to the wear parameter. In one example, the stored data includes a lookup table correlating health and energy to a corresponding wear parameter. The wear parameter may be a percentage or other value that increases as wear increases, a percentage or other value that decrease as wear increases, etc. In this manner, the wear of a component is calculated based on the overall energy applied to a component during both normal and boosted operation as well as performance indicators measured during boosted operation.

In one example, the health model 304, the energy model 308, and the wear model 312 are configured to calculate and output a motor wear parameter indicative of wear on an electric motor of the vehicle. For example, the health model 304 receives, during boosted operation, performance indicators such as a motor torque response time, a motor torque accuracy, an estimated motor coil resistance, an estimated motor coil inductance, and a maximum torque and/or current achieved and calculates the health parameter H accordingly. Conversely, the energy model 308 receives energy factors such as motor temperature, motor current, drive duration, estimated motor resistance, a motor torque request, motor pulse width modulation (PMW) data, and a torque limit and calculates the energy E accordingly. In this example, the energy E may correspond to heat generated in the motor coil during operation. The wear model 312 calculates the wear parameter W of the motor based on the heath parameter H and the energy E.

In another example, the health model 304, the energy model 308, and the wear model 312 are configured to calculate and output an inverter wear parameter indicative of wear on an inverter of an electric motor of a vehicle. For example, the health model 304 receives, during boosted operation, performance indicators such as a motor current response time, a motor current accuracy, a motor voltage response time, a motor voltage accuracy, and PWM accuracy and calculates the health parameter H accordingly. Conversely, the energy model 308 receives energy factors such as inverter temperature, inverter current, drive duration, a motor torque request, a PWM command, and a current limit and calculates the energy E accordingly. In this example, the energy E may correspond to heat generated in an inverter circuit during operation. The wear model 312 calculates the wear parameter W of the inverter based on the heath parameter H and the energy E.

In another example, the health model 304, the energy model 308, and the wear model 312 are configured to calculate and output a battery wear parameter indicative of wear on a battery of a vehicle. For example, the health model 304 receives, during boosted operation, performance indicators such as battery resistance, battery voltage and/or current, battery state of charge, and estimated capacity and calculates the health parameter H accordingly. Conversely, the energy model 308 receives energy factors such as current requests, durability current limits, measured battery current, battery and coolant temperatures, battery state of charge, and battery charging status and calculates the energy E accordingly. In this example, the energy E may correspond to total energy charged to and discharged from the battery during operation. The wear model 312 calculates the wear parameter W of the battery based on the heath parameter H and the energy E.

In another example, the health model 304, the energy model 308, and the wear model 312 are configured to calculate and output a drive unit wear parameter indicative of wear on a drive unit (e.g., including components between the motor and the wheels) of a vehicle. For example, the health model 304 receives, during boosted operation, performance indicators such as bearing vibration, bearing noise, and drive unit efficiency and calculates the health parameter H accordingly. Conversely, the energy model 308 receives energy factors such as ambient temperature, axle torque, axle speed, a drive duration, and an axle torque limit and calculates the energy E accordingly. In this example, the energy E may correspond to heat generated in bearings and gears of the drive unit during operation. The wear model 312 calculates the wear parameter W of the drive unit based on the heath parameter H and the energy E.

Figure 4:
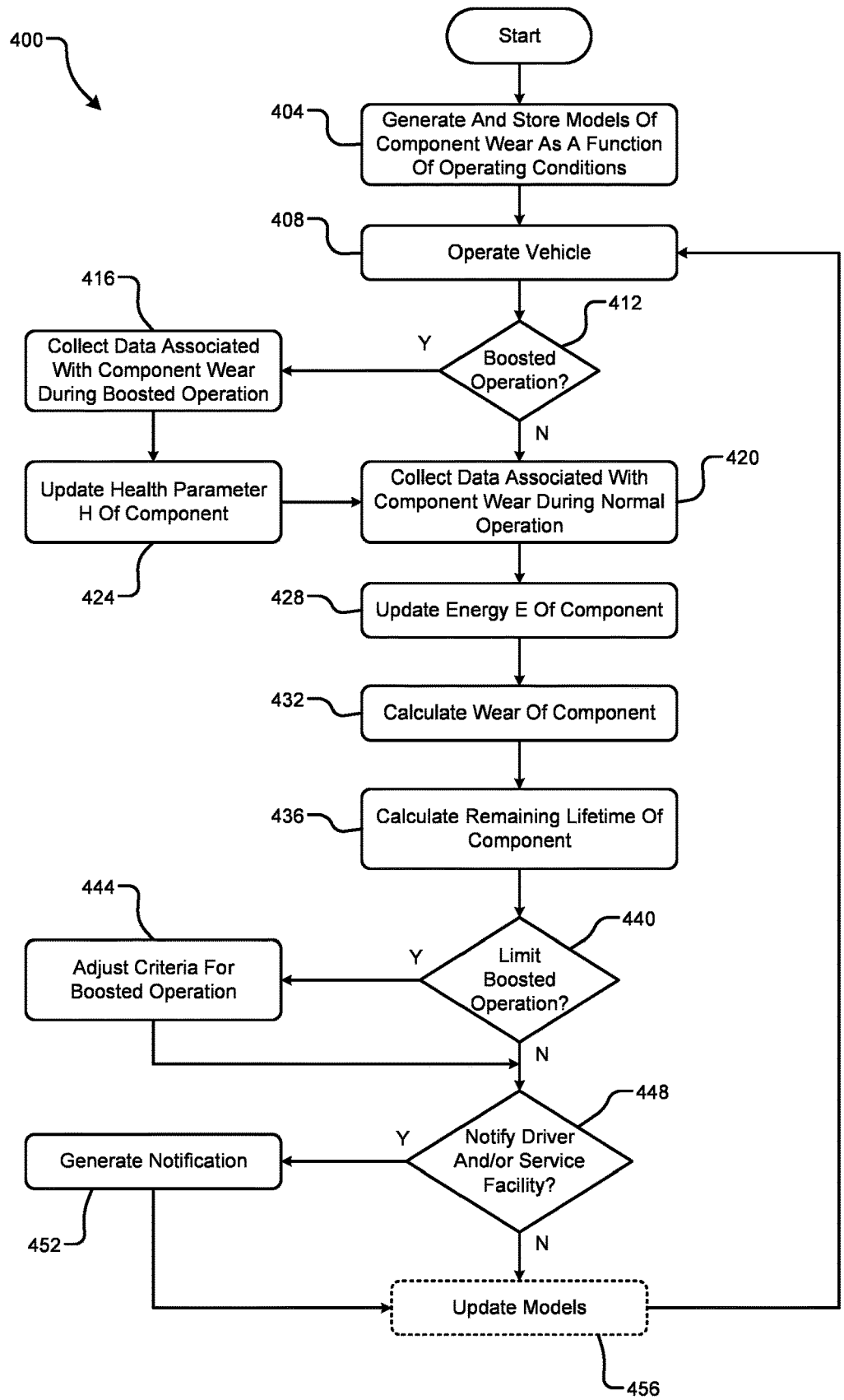
FIG. 4 is an example method for determining wear and remaining lifetime of a component of a vehicle according to the present disclosure.

Referring now to FIG. 4, an example method 400 for determining wear and remaining lifetime of a component of a vehicle according to the present disclosure is shown. At 404, the method 400 generates and stores models of component wear as a function of operating conditions for one or more components. For example, models such as the health model 304, the energy model 308, and the wear model 312 are generated and stored in the vehicle system 208, in the cloud computing system 212, etc. At 408, the vehicle is operated.

At 412, the method 400 (e.g., the diagnostic system 200) determines whether the vehicle is being operated in a boosted mode (i.e., whether boosted operation is occurring). For example, the method 400 may determine whether the vehicle is being operated in the boosted mode based on a signal from the ECM 106 indicating that boosted operation has been triggered and/or in response to one or more conditions indicative of boosted operation (e.g., a torque request greater than a threshold). If true, the method 400 continues to 416. If false, the method 400 continues to 420.

At 416, the method 400 (e.g., the diagnostic module 204, the cloud computing system 212, etc.) collects data from the vehicle system 208 associated with component wear during boosted operation. For example, the method 400 collects data to be used by the health model 304 as described above with respect to FIG. 3. In some examples, the cloud computing system 212 further collects data from other vehicles, including data associated with actual failures of the relevant component in other vehicles. At 424, the method 400 (e.g., the wear estimation module 300) updates a health parameter H based on the collected data.

At 420, the method 400 collects data from the vehicle system 208 associated with energy applied to the component. For example, the method 400 collects data to be used by the energy model 308 as described above with respect to FIG. 3. At 428, the method 400 (e.g., the wear estimation module 300) updates an energy E associated with the relevant component based on the collected data.

At 432, the method 400 (e.g., the diagnostic module 204, the cloud computing system 212, etc.) calculates a wear parameter W of the component based on the heath parameter H and the energy E. At 436, the method 400 (e.g., the diagnostic module 204, the cloud computing system 212, etc.) calculates the remaining lifetime of the component based on the calculated wear parameter W of the component.

In some examples, the cloud computing system 212 calculates the remaining lifetime of the component based on failure data collected from multiple vehicles. For example, the remaining lifetime may be calculated based on a probability of failure associated with the calculated wear parameter W (i.e., as wear increases, probability of failure increases). The probability may be expressed as a probability that a respective component will fail or a probability that any component of the vehicle will fail. In this manner, the cloud computing system 212 calculates the remaining lifetime of component using the wear parameter W calculated for the component as well as a probability of failure of the component that is based on actual (or lack of) failure of the same component in other vehicles.

At 440, the method 400 determines whether to limit boosted operation based on the calculated remaining lifetime of one or more components of the vehicle (e.g., based on whether the remaining lifetime is below a threshold). If true, the method 400 continues to 444. If false, the method 400 continues to 448.

At 444, the method 400 (e.g., the diagnostic module 204, the ECM 106, etc.) adjusts criteria for boosted operation, which may include adjusting performance limits during boosted operation and/or adjusting requirements for allowing boosted operation. For example, the method 400 changes criteria for activating boosted operation, limits a frequency of boosted operation, reduces a duration of boosted operation, etc. In one example, a torque limit during boosted operation may be reduced. For example, torque may be limited to a first amount (e.g., reduced to 80% of a maximum during boosted operation) if the remaining lifetime is below a first threshold, limited to a second amount (e.g., reduced to 60% of the maximum) if the remaining lifetime is below a second threshold, etc., and boosted operation may be completely prevented if the remaining lifetime is below a third threshold. Similarly, boosted operation may be limited to a first frequency if the remaining lifetime is below the first threshold, limited to a second frequency if the remaining lifetime is below the second threshold, etc.

In some examples, load may be redistributed. For example, multi-axle vehicles with two or more drive units, load may be distributed between drive units based on respective remaining lifetimes of the drive units. In other words, more torque may be allocated to a drive unit having a greater remaining life. For example, torque may be allocated between two drive units at a ratio of 1:1 when each of the drive units has a same remaining life and reallocated at a ratio of 1.5:1, 2:1, 3:1, etc. as remaining lifetimes of the drive units change.

At 448, the method 400 (e.g., the diagnostic module 204) determines whether to notify a driver and/or service facility (e.g. a dealership) that service is recommended based on the remaining lifetime of one or more components. If true, the method 400 continues to 452 to generate the notification. If false, the method 400 continues to 456.

At 456, the method 400 optionally updates one or more of the models. For example, in systems that include the cloud computing system 212, the model update module 224 of the cloud computing system 212 updates the models in accordance with collected data, actual failures of components, respective wear of failed components, failure probabilities, etc. In other examples, the models 204 may be updated during servicing of a vehicle (e.g., via the diagnostic port 168).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A diagnostic system for a vehicle, the diagnostic system comprising:
   a vehicle system configured to operate the vehicle in a normal operating mode and a boosted mode, wherein, in the boosted mode, the vehicle system increases at least one of a maximum motor torque, a maximum engine torque, and a maximum battery power available to the vehicle; and
   a wear estimation module configured to (i) collect wear data associated with a component of the vehicle while being operated in the boosted mode, (ii) estimate, based on the collected wear data, wear of the component caused by being operated in the boosted mode including applying a different weighting factor during the boosted mode than during the normal operating mode, wherein the weight factor increases during the boosted mode relative to the normal operating mode, and (iii) generate a prediction of a remaining lifetime of the component based on the estimated wear of the component,
   wherein the vehicle system is configured to adjust at least one of criteria for transitioning to the boosted mode and control during the boosted mode based on the prediction of the remaining lifetime of the component.

2. The diagnostic system of claim 1, wherein the wear estimation module is configured to execute at least one component wear model that models component wear as a function of operating conditions during the boosted mode.

3. The diagnostic system of claim 2, wherein the at least one model includes a health model configured to generate a health parameter H based on performance indicators of the component during the boosted mode.

4. The diagnostic system of claim 3, wherein the component is a battery and the performance indicators include at least one of battery resistance, battery voltage and/or current, battery state of charge, and estimated capacity.

5. The diagnostic system of claim 3, wherein the component is a motor and the performance indicators include at least one of a motor torque response time, a motor torque accuracy, an estimated motor coil resistance, an estimated motor coil inductance, a maximum torque achieved, and a maximum current achieved.

6. The diagnostic system of claim 3, wherein the component is an inverter and the performance indicators include at least one of a motor current response time, a motor current accuracy, a motor voltage response time, a motor voltage accuracy, and pulse width modulation accuracy.

7. The diagnostic system of claim 3, wherein the component is a drive unit and the performance indicators include at least one of bearing vibration, bearing noise, and drive unit efficiency.

8. The diagnostic system of claim 3, wherein the at least one model includes an energy model configured to generate an energy parameter E based on energy parameters indicative of energy applied to the component during the boosted mode.

9. The diagnostic system of claim 8, wherein the at least one model includes a wear model configured to generate a wear parameter indicated the wear of the component based on the health parameter H and the energy parameter E.

10. The diagnostic system of claim 1, wherein the wear estimation module is further configured to collect the wear data from a plurality of vehicles, estimate the wear of the component based on the wear data collected from the plurality of vehicles, and generate the prediction of the remaining lifetime of the component based on the wear data collected from the plurality of vehicles.

11. The diagnostic system of claim 10, wherein the wear data collected from the plurality of vehicles includes indication of failures of the component in the plurality of vehicles, and wherein the wear estimation module is configured to generate a probability that the component will fail in the vehicle based on the failures of the component in the plurality of vehicles.

12. The diagnostic system of claim 1, wherein the criteria include at least one of a maximum motor torque and a maximum engine torque available to the vehicle during the boosted mode and a frequency of the boosted mode and the control includes torque distribution to different axles of the vehicle during the boosted mode.

13. A method of determining wear of a component a vehicle, method comprising:
   transitioning the vehicle from a normal operating to a boosted mode, wherein, in the boosted mode, at least one of a maximum motor torque, a maximum engine torque, and a maximum battery power available to the vehicle is increased relative to the normal operating mode;
   collecting wear data associated with the component of the vehicle while being operated in the boosted mode;
   estimating, based on the collected wear data, the wear of the component as caused by being operated in the boosted mode including applying a different weighting factor during the boosted mode than during the normal operating mode, wherein the weight factor increases during the boosted mode relative to the normal operating mode;
   generating a prediction of a remaining lifetime of the component based on the estimated wear of the component; and
   adjusting at least one of criteria for transitioning to the boosted mode and control during the boosted mode based on the prediction of the remaining lifetime of the component.

14. The method of claim 13, wherein estimating the wear of the component includes executing at least one component wear model that models component wear as a function of operating conditions during the boosted mode.

15. The method of claim 14, wherein the at least one model includes a health model configured to generate a health parameter H based on performance indicators of the component during the boosted mode.

16. The method of claim 15, wherein at least one of the component is a battery and the performance indicators include at least one of battery resistance, battery voltage and/or current, battery state of charge, and estimated capacity;
   the component is a motor and the performance indicators include at least one of a motor torque response time, a motor torque accuracy, an estimated motor coil resistance, an estimated motor coil inductance, a maximum torque achieved, and a maximum current achieved;
   the component is an inverter and the performance indicators include at least one of a motor current response time, a motor current accuracy, a motor voltage response time, a motor voltage accuracy, and pulse width modulation accuracy; and
   the component is a drive unit and the performance indicators include at least one of bearing vibration, bearing noise, and drive unit efficiency.

17. The method of claim 15, wherein the at least one model includes an energy model configured to generate an energy parameter E based on energy parameters indicative of energy applied to the component during the boosted mode.

18. The method of claim 17, wherein the at least one model includes a wear model configured to generate a wear parameter indicated the wear of the component based on the health parameter H and the energy parameter E.

\* \* \* \* \*